Figure 13:
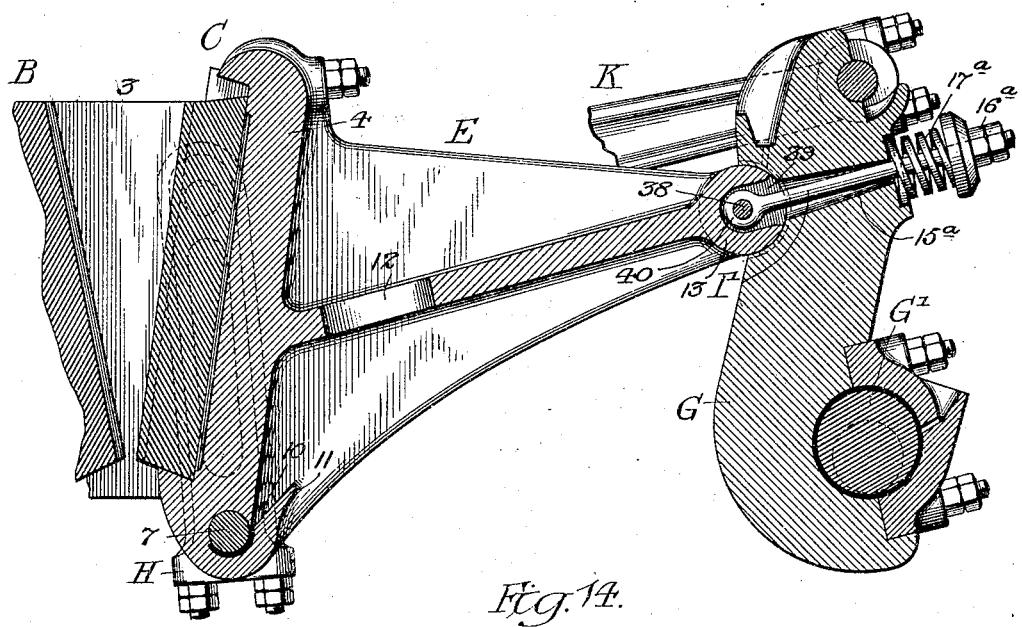

No. 788,207. PATENTED APR. 25, 1905.
T. J. GRAY.
CRUSHING MACHINE.
APPLICATION FILED OCT. 20, 1903.
7 SHEETS—SHEET 1.
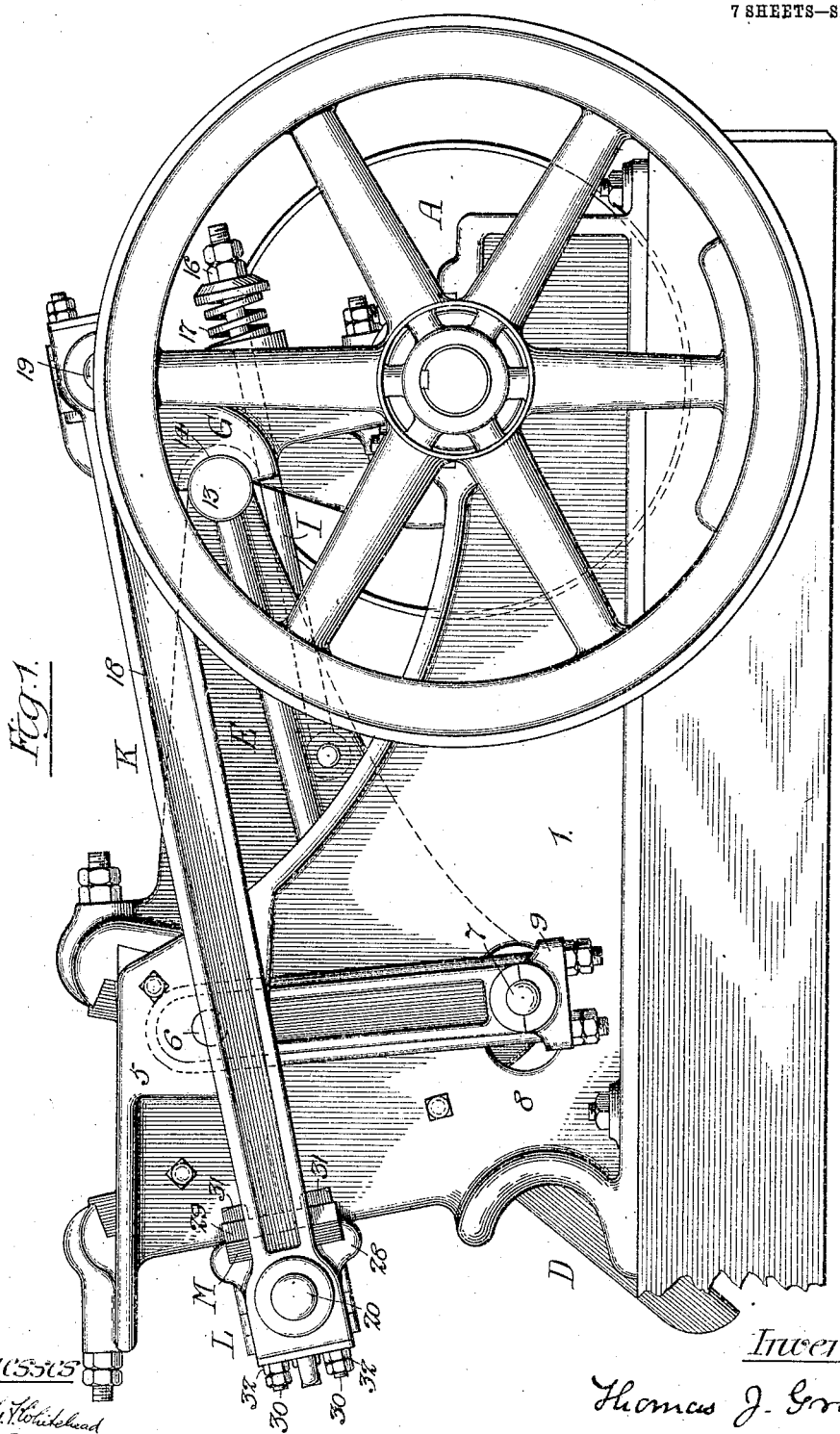

No. 788,207. PATENTED APR. 25, 1905.
T. J. GRAY.
CRUSHING MACHINE.
APPLICATION FILED OCT. 20, 1903.
7 SHEETS—SHEET 2.
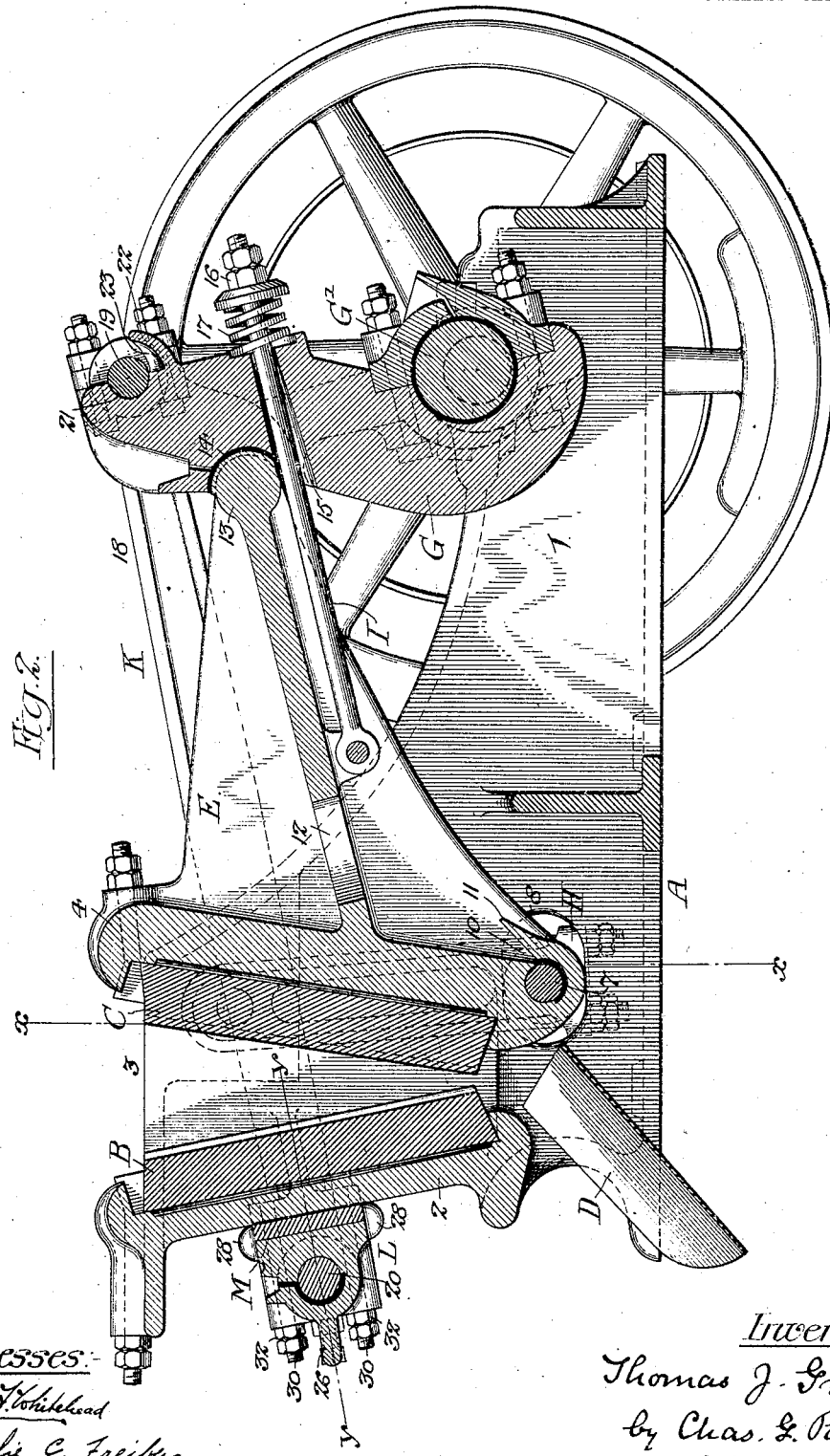
Witnesses:
Inventor:
Thomas J. Gray
by Chas. G. Page
Atty.

No. 788,207. PATENTED APR. 25, 1905.
T. J. GRAY.
CRUSHING MACHINE.
APPLICATION FILED OCT. 20, 1903.
7 SHEETS—SHEET 3.
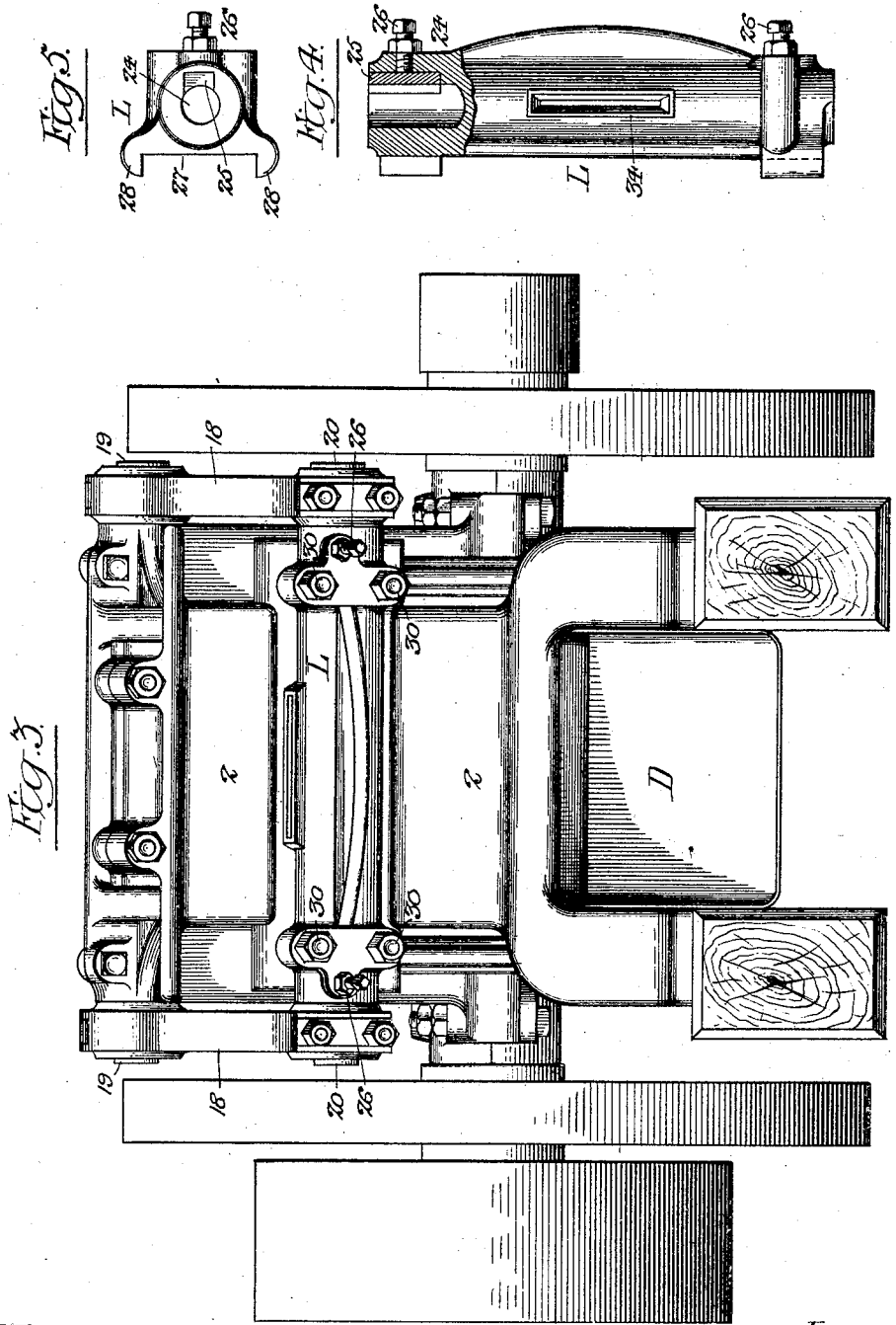

No. 788,207. PATENTED APR. 25, 1905.
T. J. GRAY.
CRUSHING MACHINE.
APPLICATION FILED OCT. 20, 1903.
7 SHEETS—SHEET 4.
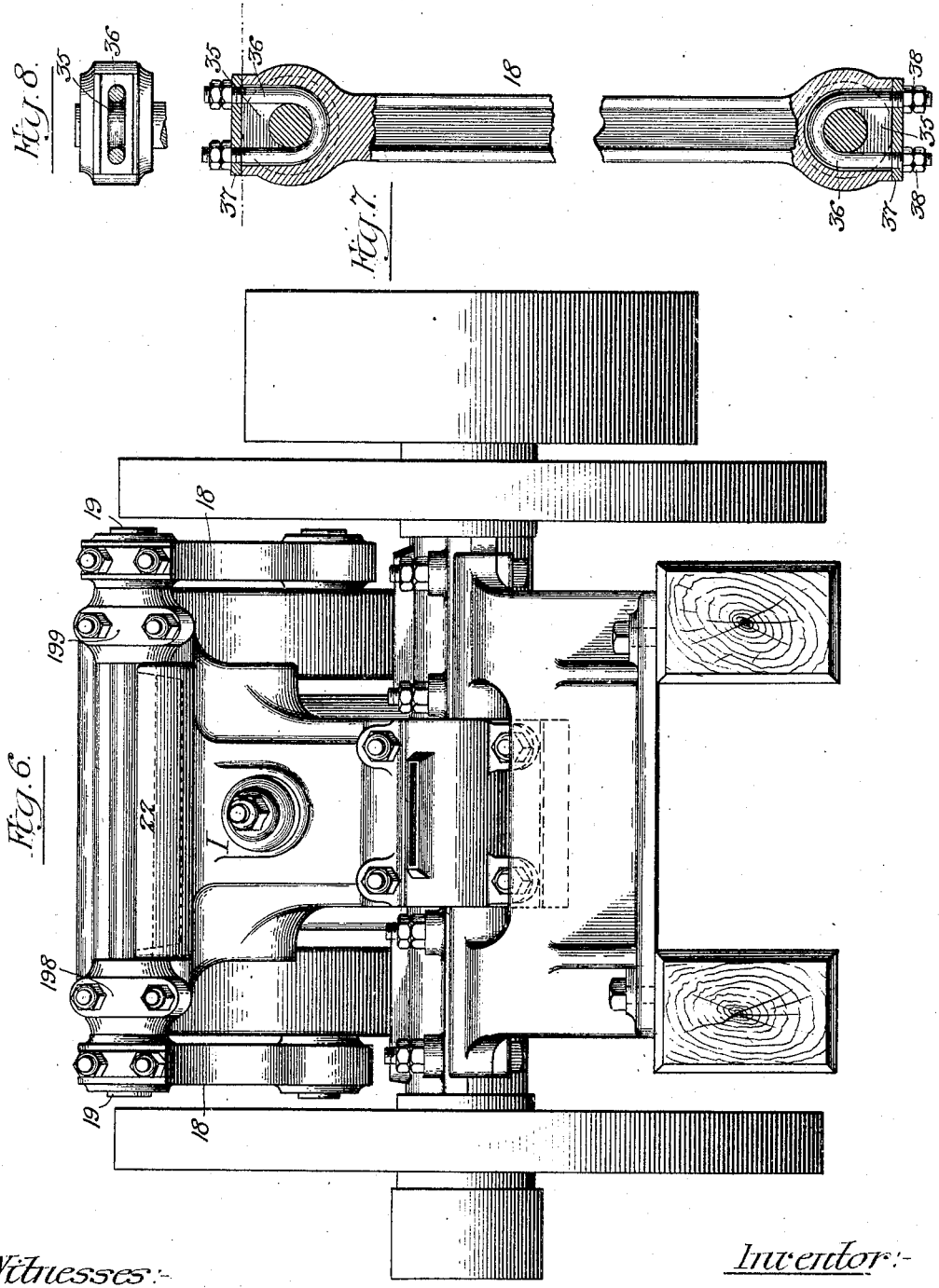
Witnesses:-
Louis M. F. Whitehead
Ottilie C. Freiberg
Inventor:-
Thomas J. Gray
By Chas. G. Page
Atty.

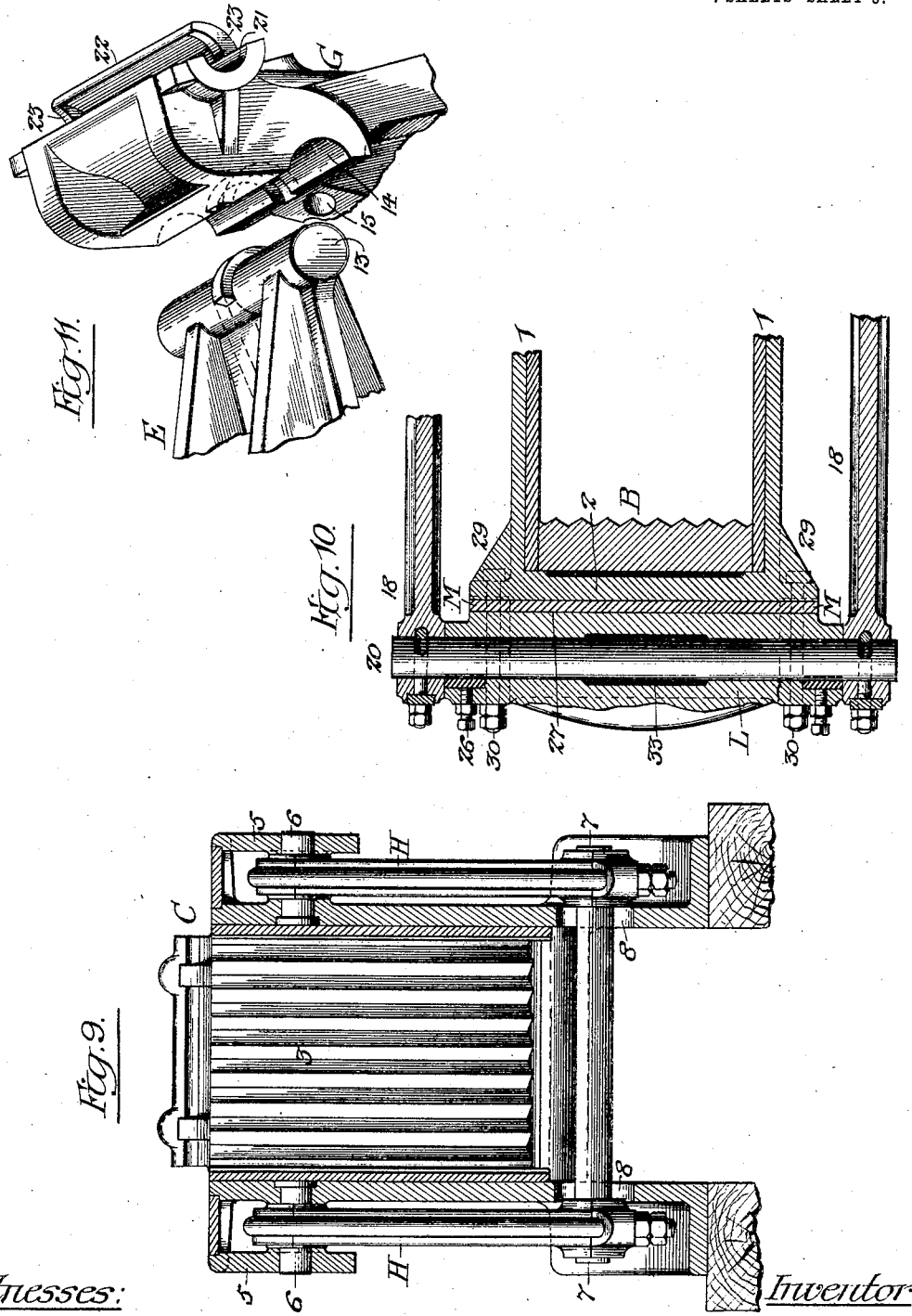

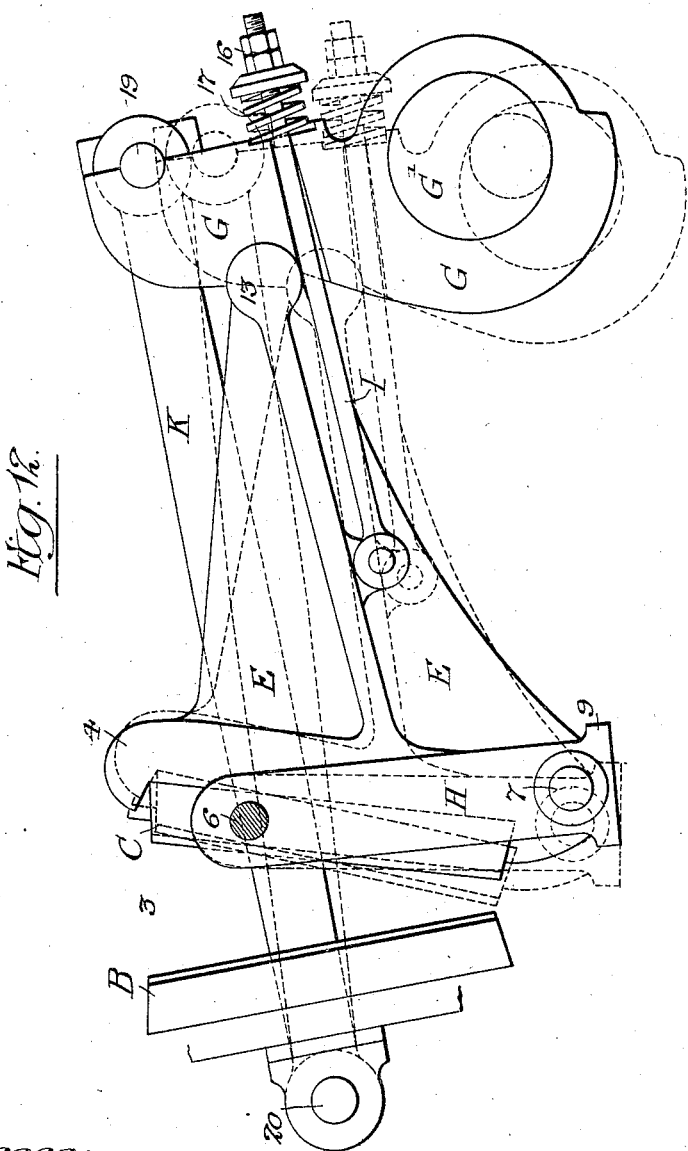

No. 788,207. Patented April 25, 1905.

UNITED STATES PATENT OFFICE.

THOMAS J. GRAY, OF CHICAGO, ILLINOIS, ASSIGNOR TO NATIONAL DRILL AND MANUFACTURING COMPANY, OF CHICAGO, ILLINOIS, A CORPORATION OF WEST VIRGINIA.

CRUSHING-MACHINE.

SPECIFICATION forming part of Letters Patent No. 788,207, dated April 25, 1905.

Application filed October 20, 1903. Serial No. 177,753.

*To all whom it may concern:*

Be it known that I, THOMAS J. GRAY, a citizen of the United States, residing at Chicago, in the county of Cook and State of Illinois, have invented certain new and useful Improvements in Crushing-Machines, of which the following is a specification.

My invention relates to crushing-machines in which the reciprocating crushing-jaw is arranged opposite a stationary crushing-jaw and actuated and controlled by a pitman with which the reciprocating jaw has a jointed connection and a pair of swinging tie-rods hinge-connected at their rear ends with the pitman and tied at their forward ends to an axis forward of the reciprocating crushing-jaw.

Objects of my invention are to relieve undue strain upon the driving-shaft which operates the pitman through the medium of an eccentric; to uphold the reciprocating jaw by suspension-links without the assistance of a spring tending to pull the jaw back and in this connection to permit an arm rigid with the reciprcating jaw to connect with the pitman by a separable hinge-joint held together by a spring; to avoid spring resistance in opposition to a toggle action comprising the pitman, an arm rigid with the reciprocating jaw and extending back to and hinge-connected with the pitman, and the pair of swinging tie-rods and also to avoid spring resistance in opposition to the forward movement of the reciprocating jaw; to cause tendency on the part of the reciprocating jaw beyond a desired limit of forward movement to compel the jaw to rise in opposition to its weight, and thereby oppose such forward movement; to more nearly balance the jaw by suspending-links than heretofore; to provide improved means for adjusting the distance between the forward axis, to which the tie-bars are tied to swing, and the axis of a hinged or pivotal connection between the tie-bars and the pitman; to adapt the pitman to support the pivot by which the tie-bars are connected with it when such pitman has been lifted out of its bearings, and to provide certain improved features of combination and arrangement, as hereinafter set forth.

Figure 14:
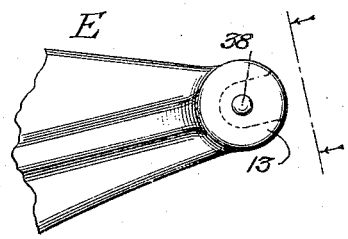
Figure 15:
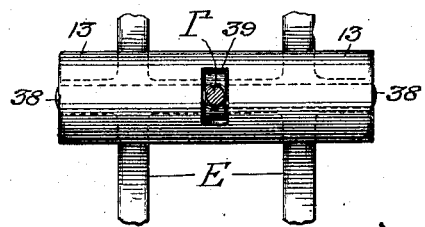

In the accompanying drawings, Figure 1 shows in side elevation a crushing-machine embodying my invention. Fig. 2 is a longitudinal central section on a vertical plane through the machine. Fig. 3 is an end elevation of the stationary-jaw end of the machine. Fig. 4 is a detail showing, partly in plan and partly in section, a bracket-bearing for one of the pivots of the vibratory yoke-frame. Fig. 5 is an end view of the bracket-bearing of Fig. 4. Fig. 6 is an end view of the machine, showing the end thereof opposite the end shown in Fig. 3. Fig. 7 is a detail showing one of the swinging links or yoke-bars partly in longitudinal section and for convenience of illustration broken at its middle portion. Fig. 8 is an end view of said link or yoke-bar. Fig. 9 is a cross-section taken through the machine on a vertical plane indicated by dotted line $x\,x$ in Fig. 2. Fig. 10 is a section through a portion of the machine on line $y\,y$ in Fig. 2. Fig. 11 is a detail showing in perspective portions of the reciprocating-jaw arm and the pitman. Fig. 12 is in the nature of a diagrammatic view showing by full and dotted lines the two extremes of movement on the part of the reciprocating jaw. Fig. 13 is a detail showing a longitudinal central section on a vertical plane through the reciprocating jaw and pitman and illustrating the toggle device with the tension-rod hinged to the rear end of the jaw-arm. Fig. 14 is a detail showing in side elevation the rear end portion of the jaw-arm of Fig. 13. Fig. 15 is a rear elevation of the rear end of the jaw-arm of Fig. 14.

The body-frame A of the machine comprises a pair of longitudinally-extending sides 1, which at the forward end of the machine are united by an upright transversely-extending end portion 2, adapted to form a backing and holder for the crushing-jaw B. A reciprocating crushing-jaw C is arranged in rear of and opposite the stationary jaw B, the opposing faces of these two jaws and portions of the inner walls of the longitudinal sides 1 of the body-frame serving to provide a hopper in which stone and the like is crushed between the jaws and from which the crushed material is discharged into a trough or chute D. The reciprocating jaw C, thus arranged within the body-frame, comprises a suitable plate 3 and a backing portion 4 therefor, provided with an arm E rigid therewith and arranged to extend back to and connect with a pitman G, which serves to actuate the reciprocating jaw and to support the arm E at its rear end. The reciprocating jaw C is therefore provided with a rearwardly-extending arm which is rigid therewith, so that the joint between the jaw and the pitman is at the point where the rear end of the arm and the pitman are articulated or hinge-connected. The pitman is operated as is usual in machines of the class to which my improved machine relates— as, for example, the pitman is operated by an eccentric G' on a rotary power-driven shaft.

The rear end of the arm E is supported by the pitman in rear of the jaw C, and said jaw is supported by a pair of suspending-links H, arranged forward of the pitman. These suspending-links depend from and swing about a transverse axis, and as a convenient arrangement their upper ends are pivoted in recesses, Fig. 9, which are formed between the sides 1 of the body-frame and ears or castings 5 on said sides. The pivots 6 for these links have their bearings in the sides 1 and in the ears or castings 5 thereon, said ears or castings being arranged outside of the body-frame, so as to afford bearings for the outer ends of the pivots 6 and permit the suspending-links to swing outside of the body-frame in vertical planes parallel with the sides 1. With this arrangement the pivots for the suspending-links are shielded from dust and dirt, and the links can be arranged to operate in an advantageous position without interfering with or encroaching upon the hopper-space.

The lower ends of the suspending-links are pivotally connected with the lower portion of the reciprocating jaw, and as a preferred connection between these members the lower end portion of the jaw is pivotally supported upon a transversely-arranged pivot-rod 7, which extends through openings 8 in the sides 1 of the body-frame, so as to permit its ends to connect with the lower ends of the suspension-links. The openings 8 are of a length to permit the desired extent of forward-and-back movement on the part of the pivot-rod 7, which is by preference rigidly secured to the suspension-links, it being, for example, clamped between the lower ends of the links and bearing blocks or plates 9, Fig. 11, which are detachably secured to the links by suitable bolts and nuts. The swinging links H thus arranged depend from and swing about a transverse horizontal axis extending axially through the elevated pivots 6. This axis is arranged back of the face of the reciprocating jaw, so that the links are pivotally hung back of the face of the reciprocating jaw at a point between such jaw-face and the pitman, an object of this arrangement being to permit the necessary and predetermined forward movement of the jaw to bring the links into a vertical or substantially vertical position, as in dotted lines in Fig. 12.

When the links swing rearwardly, the axis of the lower pivot-rod which connects them with the reciprocating jaw will move rearwardly and upwardly in the arc of a circle, so as to raise the jaw, and when the links swing forwardly said axis will move forwardly and downwardly in the same arc; but when such forward movement is of sufficient extent to bring the links into a vertical position the links will naturally sustain the weight of the heavy jaw, and any disposition on the part of the jaw to move still farther forward as the result of momentum acquired during its forward motion this undesirable and unnecessary farther forward movement will be opposed by the weight of the jaw, which if thus moved farther forward would necessarily swing the links forwardly and upwardly and in so doing raise the axis of the pivot 7 and lift the jaw in opposition to its weight. The links thus arranged are therefore in the nature of stops tending to define the limit of forward movement on the part of the reciprocating jaw and at the same time permitting the jaw during its two extremes of movement to rise and fall, so as to produce a grinding action in addition to its direct or lateral crushing action. The links thus arranged also more nearly balance the jaw than in cases where the links are pivoted forward of the face of the reciprocating crushing-jaw, and hence less power is required to uphold the jaw and less strain upon the pitman is involved.

As a matter of further improvement in details the shaft or pivot 7 extends through a transverse bore in the lower portion of the reciprocating jaw portion c. This bore, which forms a bearing for said pivot, is provided with a lateral aperture 10, Fig. 2, which opens at the back of the reciprocating jaw portion, whereby lubricant can be admitted between the jaw portion and the pivot. The lower part of the reciprocating jaw is also provided with an upwardly-extending lip 11, arranged to form a receptacle for cotton-waste, such as usually employed in lubricating machinery, and the rearwardly-extending arm F of the reciprocating jaw is provided with an opening 12, through which ready access can be had to the receptacle referred to.

The rear end of the jaw-arm E has a separable jointed connection with the pitman, the integrity of such hinge or pivotal joint being maintained by a spring arranged to maintain the arm in connection with the pitman, but so disposed as to avoid resistance to the forward movement of the jaw, as in machines where the reciprocating jaw is subject during operation to the action of a spring which presents a yielding and gradually-increasing spring resistance to the forward movement of the jaw. The joint thus provided between the jaw-arm and the pitman is attained by rounding the rear end of the arm, so as to provide it with a pintle portion 13, which is fitted to turn in a concave socket-bearing 14 in the forward side of the pitman, which latter is therefore, in effect, an abutment for the rear end of the jaw-arm. This arrangement materially simplifies the connection between the jaw-arm and pitman, and during operation strain upon the jointed connection as an incident to the peculiar relative action of the jaw-arm and pitman is reduced. As a means for thus maintaining the integrity of the hinge or pivotal connection between the jaw-arm and the pitman a spring connecting-rod I is hinge-connected with the reciprocating jaw and arranged to extend back through an opening 15 in the pitman. The rod I is of sufficient length to project back from the pitman and to receive upon its projecting rear end portion an adjustable nut 16 and a spring 17, arranged between the rear side of the pitman and such adjustable nut. This connecting-rod I is arranged parallel or substantially parallel with a right line between the middle of the reciprocating jaw and the axis of the hinge connection between the jaw-arm and the pitman, so as to reduce action and wear and tear on the part of the spring during operation to a minimum.

The connecting-rod I is practically connected with the rear jaw portion 4, although, as shown, its forward end is directly hinged or pivoted to the arm E at a point back of the jaw portion 4; but as such jaw portion and the arm are rigidly united the rod is, in effect, hinged to the jaw. In order to compensate for relative different movements on the part of the jaw-arm and the pitman during operation, the opening 15 for the connecting-rod enlarges in diameter from its rear to its forward end, as in Fig. 2, whereby the rod may have a slight relative lateral play or up-and-down swing during operation, the effect of such arrangement being that the connecting-rod has a sliding spring-hinge connection with the pitman. Practically considered, however, the opening 15 and the rod I are both in alinement with the middle portion or center of the reciprocating jaw. The spring-connected rod thus arranged permits an easy action on the part of the toggle comprising the jaw-arm, the pitman, and the swinging tie-bars hereinafter referred to, and while avoiding undue strain during certain phases of the operation and yielding, so as to accommodate the varying relative positions of such members, it continues to maintain the jaw-arm in working and proper hinge connection with the pitman.

The pitman is controlled so as to have a suitable up-and-down movement and prevented from falling either forwardly or rearwardly by a vibratory tie device K, preferably in the nature of a yoke, which is tied or supported at its forward end to swing about a transverse axis at a point forward of the reciprocating jaw and pivotally connected with the upper or outer end portion of the pitman. This tie device comprises a pair of parallel tie-bars 18, respectively arranged at opposite sides of the machine and having their rear ends connected together by a transverse rod or pivot 19, attached to the pitman, their forward ends being connected together by a transverse rod or pivot 20, supported by bearings at the forward end of the machine.

The forward-and-back movements of the reciprocating jaw are determined by the length of these tie-bars or the distance between the axis about which they swing at their forward ends and the axis of their pivotal connection with the pitman, and hence the limit of the forward-and-back swing of the suspending-links H is also determined by these swinging tie-bars. During operation the axis of their pivotal connection with the pitman moves up and down in the arc of a circle having as its center the axis to which the forward ends of the tie-bars are tied. The point of connection between the jaw-arm and the pitman and the point of connection between the tie-bars and the pitman are arranged to permit the pair of swinging tie-bars, the jaw-arm rigid with the reciprocating jaw, and the pitman or a portion thereof to form the three members of a three-membered toggle, while at the same time the pair of tie-bars avoid all necessity for a spring tension-rod connecting the reciprocating jaw with the body-frame and control the range of action on the part of the reciprocating jaw. The suspension-links are therefore arranged with reference to the tie-bars, which determine the extent of forward-and-rearward swing of such links. The reciprocating jaw is therefore subject to the action of the tie-bars during operation, while its forward movement is of course not opposed by the spring connecting-rod, which, however, permits the toggle to operate easily and effectively and at the same time maintains connection between the jaw-arm and the pitman.

In order to form a hinge connection between the tie-bars and the pitman, the latter has its rear side provided with a transversely-extending concave groove 21, Fig. 2, which receives and provides a bearing for the rod or pivot 19. At a point just below said groove 21 the pitman is formed or provided with a rearwardly and upwardly extending curved flange or ledge 22, adapted to serve as a trough or receptacle for cotton-waste, the flange or ledge 22 being provided at its ends with end walls or flanges 23, formed in planes parallel with the yoke-bars 18 and preferably curved along their upper edges, so that when the rod 19 is disconnected from its bearing in the pitman by moving the pitman forward independently of the yoke or pushing the yoke rearwardly and independently of the pitman the rod 19 will be caught upon and sustained by the end portions 23 of the ledge referred to, and thereby prevent the rear end of the rod 19 from dropping and maintain it in convenient position for readjustment. The pivot 19 is also held in connection with the pitman by bearing-caps 19$^a$, detachably bolted to the pitman, as in Fig. 6.

The transverse shaft or rod 20, which serves as a pivot for the vibratory tie-bars, is supported in a bracket L, arranged opposite and near the forward end 2 of the body-frame and adjustably secured to the latter. The bracket L, which is shown applied in Figs. 1, 2, 3, and 10 and illustrated in detail in Figs. 4 and 5, is an oblong casting or bearing having a bore 24, Figs. 4 and 5, for the rod or shaft 20 and containing adjustable gibs or bearing portions 25, which are arranged for taking up wear and adjusted by bolts or set-screws 26. The bracket L engages and is backed by a plate M, which is detachably confined between the bracket and the end 2 of the body-frame, the object of this arrangement being to adjust the position of the axis of the rod or pivot 20 relatively to the pitman by adjusting bracket-bearing L and substituting for the plate M shown a similar plate of different thickness to fill the space between such bracket-bearing and the body-frame.

The plate M lies against the flat rear side 27, Figs. 5 and 10, of the bracket L, and the latter is provided at each end with a pair of rearwardly-projecting lugs 28, forming jaws which engage the upper and lower edges of the plate M, as best shown in Fig. 1. In order to maintain the bracket L in position upon the body-frame, the forward end portion of the latter has at each side a laterally-projecting lug 29, forming a bearing, as in Figs. 1 and 10. With this arrangement the bracket L is provided with bolt-holes for two pairs of bolts 30, which are arranged transversely to the axis of the rod or pivot 20, and the lugs or bearings 29 are also provided with suitable holes for such bolts, the bolts of each pair being respectively above and below the rod or pivot 20, so as to secure a steady reliable connection between the bracket and the body-frame. As a preferred arrangement the heads 31 of the bolts 30, Fig. 1, bear against the rear sides of the lugs or bearings 29, and the opposite threaded end portions of such bolts project outwardly and forwardly from the bracket, so as to receive nuts 32, which being thus arranged are easily accessible for adjustment. In order to remove plate M, so that another plate of different thickness can be substituted therefor, the nuts 32 on the rods 30 can be removed or adjusted in directions away from the bracket, and by then moving the pitman forward the bracket will be shifted away from the body-frame to an extent to disengage it from the plate M and permit the latter to be lifted out of place and another plate substituted. The plate M, which is upheld by the bracket, provides a solid bearing between the bracket and the body-frame, and by changing such plate the adjustment of the yoke can be effected without disturbing the connection between the side bars of the yoke and its end cross rods or pivots. The bracket also affords a long and substantial bearing for the rod or pivot 20, and in order to insure the free operation of such rod as a rock-shaft the bore through the bracket is laterally enlarged at a point between its ends, as at 33, Fig. 10, to form an oil-receptacle into which lubricant can be introduced by way of a passage 34, Fig. 4, in the bracket.

The cross rods or pivots 19 and 20 are secured at their ends to the vibratory links or bars 18, illustration of such connection being best afforded by Figs. 7 and 8, in which each end of the bar 18 is enlarged and provided with a recess 35, opening at the end of the bar and having a pair of circular holes respectively formed through opposite sides of the recess to receive an end of the rod or pivot. In order to rigidly bind or clamp the rod or pivot to the bar, a staple-shaped clamp 36 is arranged to straddle the portion of the rod or pivot within the recess 35, the end portions of such clamp being projected from the recess so as to extend through a bearing-plate 37 and receive nuts 38, which are tightened against the outer side of the bearing-plate. In this way the plate 37 bears against the end of the bar, and by tightening up the nuts the rod or pivot and the bar can be firmly clamped together.

During the operation of the machine the reciprocating jaw will have a bodily forward-and-back movement, and it will also rock or tilt about the axis of the pivot 7, by which the lower ends of the swinging links are attached to such jaw. The arm which is rigid with the reciprocating jaw, the pair of swinging tie-bars which are connected with the pitman, and the portion of the pitman between its connections with the jaw-arm and the pair of tie-bars operate as a three-membered toggle, the spring tension connecting-rod serving during such operation to maintain the integrity of the hinge connection between the jaw-arm and the pitman. The toggle thus described and the eccentric or equivalent device employed for operating the pitman are relatively timed and arranged so that when the reciprocating jaw is at the limit of its forward bodily movement its weight will be substantially sustained by the links, which at such juncture hinge in a vertical or substantially vertical position.

During the rearward bodily movement of the reciprocating jaw its supporting-links swing rearwardly to a limited extent, but sufficiently to move the axis of pivot 7 upwardly in the arc of a circle, it being observed that this forward-and-back movement on the part of the links serves to bodily raise and lower the reciprocating jaw to an extent to produce a suitable grinding action. At all times, however, the links hang so nearly vertical as to take the major portion of the weight of the reciprocating jaw, and thereby relieve the power-shaft from undue strain and permit me to use as a means for keeping together the jaw-arm and the pitman a comparatively light spring, and by thus employing a comparatively light spring the operation of the toggle and the slight action of the hinge-joint between the jaw-arm and the pitman are not materially opposed. It is also understood that the action of the spring is lessened proportionally to the proximity of the tension or tension connecting-rod to a line between the middle of the reciprocating jaw and the axis of the hinge-joint between the jaw-arm and the pitman. It is also understood that, if desired, the spring tension-rod can be duplicated, or, in other words, I can employ a pair of such rods in place of the single rod shown and arrange them side by side.

While the tension-rod I could be arranged out of parallel with a right line extending from the hinge-joint between the jaw-arm and pitman to the center of the reciprocating jaw as a means for holding together the parts forming such hinge-joint, it will be seen that the more the tension-rod deviates from said condition the greater will be the action of spring 16 during the operation of the toggle action, and hence the greater will be the spring resistance in opposition to such operation, and the life of the spring will be materially shortened, it being observed that while thus providing a spring capable of increased spring action it must also be sufficiently strong to hold together the parts of the hinge-joint. As illustrative of the fact that the tension-rod may be exactly coincident with a right line between the said hinge-joint and the center of the reciprocating crushing-jaw, Figs. 13, 14, and 15 show the hinge-pintle bearing formed by the rear end 13 of the jaw-arm E, bored to receive and hold a pivot 38 and also provided with a rear recess 39, which is intersected by the axis of said bore and adapted for the insertion and removal of the forward end of a short tension-rod I', having an eye 40, through which said pivot extends. With this arrangement the pitman has an opening 15ª corresponding with the opening 15 in preceding figures, but arranged just back of the hinge-pintle 15 and in alinement with a right line between the center of the jaw and the pivot 38. The short tension-rod I' extends through this opening 15ª and is connected with the pitman by a spring 17ª, corresponding with the spring 17 in preceding figures. With this arrangement there will of course be a slight relative rocking action between the pitman and the tension-rod at the rear end of the opening in the pitman, as in preceding figures, but the action of spring 17 will be practically imperceptible, it being just sufficient to accommodate the relative rock or tilt between the tension-rod and the pitman.

What I claim as my invention is—

1. In a crushing-machine, a reciprocating jaw supported for tilting and bodily forward-and-back movement; a toggle action for operating the reciprocating jaw comprising a pitman, an arm rigid with the reciprocating jaw and extending back to and having a separable hinge connection with the pitman, and a pair of swinging tie-bars hinge-connected with the pitman and tied to an axis forward of the reciprocating jaw; and a tension-rod extending between the reciprocating jaw and the pitman and arranged substantially parallel with and adjacent to a right line between the central portion of the reciprocating jaw and the point of hinge connection between the jaw-arm and the pitman, the tension-rod thus arranged between the reciprocating jaw and the pitman having jointed connections therewith and having a spring interposed in one connection to maintain the jaw-arm in hinge connection with the pitman.

2. In a crushing-machine, a reciprocating jaw supported for tilting and bodily forward-and-back movement; a toggle action for operating the reciprocating jaw comprising a pitman, an arm rigid with the reciprocating jaw and extending back to and having a separable hinge connection with the pitman, and a pair of swinging tie-bars hinge-connected with the pitman and tied to an axis forward of the reciprocating jaw; and a tension-rod extending between the reciprocating jaw and the pitman and arranged substantially on a level with the hinge connection between the jaw-arm and the pitman, and a point midway of the upper and lower ends of the jaw-face, the tension-rod thus arranged between the reciprocating jaw and the pitman having jointed connections therewith and having a spring interposed in one connection to maintain the jaw-arm in hinge connection with the pitman.

3. In a crushing-machine, a reciprocating crushing-jaw; a pitman for operating the reciprocating crushing-jaw; and vibratory side bars having their ends connected by transverse rods or pivots respectively engaging the pitman and a bearing forward of the reciprocating crushing-jaw; one or more of the ends of such vibratory bars being recessed and having openings through the side walls of such recess for a rod or pivot, and provided with a staple-shaped clamp engaging the rod or pivot, an end plate through which the end portions of the staple-shaped clamp extend; and nuts fitted upon threaded ends of the staple-shaped clamp and serving to hold the plate against the end of the bar.

4. A crushing-machine comprising a stationary jaw; a reciprocating jaw having a rearwardly-extending arm rigid therewith; a pair of swinging suspending links H pivotally supported at their upper ends and attached at their lower ends to a transverse shaft 7 upon which the reciprocating jaw is pivotally supported; a pitman with which the said arm of the reciprocating jaw has a jointed connection; swinging tension-rods having jointed connection with the pitman and tied to swing about an axis forward of the reciprocating crushing-jaw; and a spring tension-rod forming a yielding connection between the reciprocating jaw and the pitman and arranged substantially parallel with the swinging tension-rods which are tied to swing about an axis forward of the reciprocating crushing-jaw.

5. A crushing-machine comprising a stationary jaw; a reciprocating jaw having a rearwardly-extending arm rigid therewith; a pair of swinging links H pivotally supported at their upper ends and attached at their lower ends to a transverse shaft 7 upon which the reciprocating jaw is pivotally supported; a pitman with which the said arm of the reciprocating jaw has a jointed connection; a pair of swinging tension-rods having jointed connection with the pitman and tied to swing about an axis forward of the reciprocating crushing-jaw; and a spring tension-rod providing a yielding spring connection between the pitman and the reciprocating crushing-jaw and arranged parallel or substantially parallel with a right line extending forward from the connection between the jaw-arm and the pitman and intersecting the reciprocating jaw at a point between the axis of the pivot-shaft 7 and an axis about which the suspending links swing, the connection between the jaw-arm and pitman being at a point between the axis of the pivotal or jointed connection between the tension-rods K and the pitman, and the axis about which the pitman operates.

6. In a crushing-machine, a reciprocating crushing-jaw and an arm extending rearwardly therefrom; a pitman engaging said arm and having its rear side provided with a bearing-recess 21, and a rearwardly-projecting ledge 22 formed with end portions 23; vibratory arms having their rear ends connected by a transverse rod or pivot 19 removably fitted in the said bearing-recess, and having their opposite ends tied to an axis forward of the reciprocating jaw; the ledge 22 being adapted to form a receptacle having end portions 23 which serve to support the rod or pivot 19 when the latter is removed from the bearing-recess.

7. In a crushing-machine, a reciprocating jaw; a toggle comprising a pitman, an arm rigid with the reciprocating jaw and having a separable hinge connection with the pitman, and a pair of tie-bars hinge-connected with the pitman and tied to an axis forward of the reciprocating jaw; and a tension-rod interposed as a connection between the reciprocating jaw and the pitman and to such end tied at its forward end to the jaw-arm at the axis of the hinge-joint between such jaw-arm and the pitman and extending back through an opening in the pitman and having a spring connection with the latter.

8. In a crushing-machine, the combination of a suitable body-frame; a stationary jaw secured to said body-frame; a movable jaw opposed to said stationary jaw and provided with a rigid rearwardly-extending toggle-arm; swinging links pivoted at their upper end to the body-frame and their lower ends being pivotally connected with the lower portion of the movable jaw; a vertically-reciprocating pitman actuated at its lower end by an eccentric device, said pitman being provided between its upper and lower end with a bearing adapted to engage the rear end of said toggle-arm; swinging arms K connecting the upper end of the pitman with an axis forward of the movable jaw; a rod hinged at one end to the arm of the movable jaw and extending back through an opening in the pitman; and a spring arranged between the back of the pitman and a shoulder with which the rear end portion of said rod is provided; the opening in the pitman through which the rod passes being suitably enlarged to permit the rod to have an up and down swinging play independent of the pitman and said opening being formed in the pitman at a point between the eccentric and the point where the movable jaw-arm engages the pitman.

THOMAS J. GRAY.

Witnesses:
CHARLES G. PAGE,
OTTILIE C. FREIBERG.